(12) United States Patent
Suzuki

(10) Patent No.: US 8,791,819 B2
(45) Date of Patent: Jul. 29, 2014

(54) INTERCOM EXCHANGE

(75) Inventor: Akihiro Suzuki, Kobe (JP)

(73) Assignee: Toa Corporation, Hyogo (JP)

(*) Notice: Subject to any disclaimer, the term of this patent is extended or adjusted under 35 U.S.C. 154(b) by 58 days.

(21) Appl. No.: 13/147,632

(22) PCT Filed: Feb. 4, 2010

(86) PCT No.: PCT/JP2010/051583
§ 371 (c)(1),
(2), (4) Date: Aug. 3, 2011

(87) PCT Pub. No.: WO2010/090249
PCT Pub. Date: Aug. 12, 2010

(65) Prior Publication Data
US 2011/0291833 A1 Dec. 1, 2011

(30) Foreign Application Priority Data
Feb. 9, 2009 (JP) ................................. 2009-027026

(51) Int. Cl.
| | |
|---|---|
| *G08B 13/00* | (2006.01) |
| *G08B 25/00* | (2006.01) |
| *G08B 13/16* | (2006.01) |
| *G08B 13/196* | (2006.01) |
| *H04M 11/04* | (2006.01) |

(52) U.S. Cl.
CPC .......... *G08B 13/1672* (2013.01); *G08B 25/006* (2013.01); *G08B 13/19645* (2013.01); *H04M 11/04* (2013.01)
USPC ..................... 340/541; 340/539.1; 340/545.2; 340/540; 367/93; 381/163

(58) Field of Classification Search
CPC ..................... G01C 21/3415; G08G 1/096827; G08G 1/096866; G08G 1/096872; G08G 1/096844; G08B 13/08; E05B 45/06; E05B 43/00; E05B 45/125; E05B 65/108; G06Q 10/00; G06Q 20/102; G06Q 20/145; G06Q 50/06; G05D 17/00; G05D 3/12; G07F 15/008; H02J 3/008
USPC ........ 340/541, 540, 7.28, 539.22, 523, 539.1, 340/539.23, 545.2, 565, 566; 367/93; 381/59, 163
See application file for complete search history.

(56) References Cited

U.S. PATENT DOCUMENTS

| | | | |
|---|---|---|---|
| 7,317,389 B2* | 1/2008 | Yokota .......................... | 340/540 |
| 2004/0155963 A1* | 8/2004 | Kondo et al. ................. | 348/180 |
| 2011/0018706 A1* | 1/2011 | Egawa ........................ | 340/539.1 |

FOREIGN PATENT DOCUMENTS

| | | | |
|---|---|---|---|
| JP | 05-003515 A | 8/1993 | |
| JP | 07-307811 A | 11/1995 | |

(Continued)

OTHER PUBLICATIONS

International Search Report of Corresponding International Application No. PCT/JP2010/051583, dated Mar. 16, 2010.

*Primary Examiner* — Omer S Khan
(74) *Attorney, Agent, or Firm* — Global IP Counselors, LLP

(57) ABSTRACT

An intercom exchange is connected to multiple terminals, and includes multiple communication paths, a digital switch circuit for switching connections between the terminals and the communication paths, and a CPU that controls the DSPs and the switch circuit. The CPU performs control for preferentially allocating a communication path to the first terminal, and the allocated DSP determines whether a sound from the first terminal that has been received as input via the switch circuit is an abnormal sound. Upon determining that the sound is an abnormal sound, the allocated DSP notifies the CPU, and upon receiving the notification, the CPU determines an alert destination based on the notification and performs alert processing for sending an alert to the alert destination.

7 Claims, 8 Drawing Sheets

(56) References Cited

FOREIGN PATENT DOCUMENTS

| JP | 2004-112387 A | 4/2004 |
| JP | 2006-114968 A | 4/2006 |
| JP | 3879641 B | 2/2007 |

* cited by examiner 141 (Control table)

| Terminal No. | Type | Master Device No. | Warning Light | Camera | Audio Trigger Function | Installation Location | External Contact No. |
|---|---|---|---|---|---|---|---|
| 1 | Door intercom | 1 | Yes | No | Enabled | Parking lot | 1 |
| 2 | Intercom | 1 | No | Yes | Disabled | Entrance | |
| 3 | Door intercom | 1 | No | No | Enabled | Lobby | 1 |

FIG. 3

142 (Allocation table)

| Terminal No. | DSP No. |
|---|---|
| 1 | 1 |
| 3 | 2 |
| ⋮ | ⋮ |

FIG. 4

INTERCOM EXCHANGE

CROSS-REFERENCE TO RELATED APPLICATIONS

This U.S. National stage application claims priority under 35 U.S.C. §119(a) to Japanese Patent Application No. 2009-027026, filed in Japan on Feb. 9, 2009, the entire contents of which are hereby incorporated herein by reference.

TECHNICAL FIELD

The present invention relates to an intercom exchange that can switch multiple communication paths between terminals.

BACKGROUND ART

In recent years, intercom systems that enable communication between a master device and a slave device have been utilized to achieve a crime prevention effect. A conventional intercom system has a slave device, a master device that can respond to a call from the slave device, and an auxiliary master device that can respond to a call from the master device, and both the master device and the auxiliary master device are equipped with a microphone. If a sound picked up by either of the microphones is abnormal, the master device sends a notification corresponding to the abnormal state to an external terminal. Such technology is disclosed in Japanese Patent Publication No. 3879641, for example.

SUMMARY

Technical Problem to be Solved by Invention

However, in conventional intercom systems, even if it has been detected that, for example, a sound picked up by the microphone of the auxiliary master device is abnormal, depending on the usage situation or the like at that time, there are cases where a communication network cannot be ensured in the system, and notification of the occurrence of an abnormality cannot be performed. This is because with an intercom system, the master device generally cannot communicate with multiple terminals (the auxiliary master device and the slave device) at the same time, and therefore if the master device is communicating with another terminal (e.g., the slave device) when an abnormal sound is picked up by the microphone of the auxiliary master device, the communication path between that auxiliary master device and the master device cannot be used. This means that multiple communication paths between the master device and terminals cannot be used at the same time in conventional intercom systems, which is a serious problem particularly in the case where an abnormal sound has been picked up by a microphone.

Furthermore, conventional auxiliary master devices and slave devices have a function for detecting whether a sound is an abnormal sound. In other words, since each terminal detects whether a sound is an abnormal sound in conventional intercom systems, reduction in the size of the terminal is limited.

The present invention has been achieved in view of such a situation, and an object thereof is to provide an intercom exchange that enables an alert to be reliably sent if an abnormal sound has been detected, even if there is the risk of multiple communication paths between terminals being used at the same time, without the detection regarding an abnormal sound being performed by terminals.

Solution to Problem

In order to address the problems described above, the present invention is an intercom exchange connected to a plurality of terminals including a first terminal that has a sound input/output function for automatically inputting and outputting an external sound, the intercom exchange including: a plurality of communication paths, each of the plurality of communication paths including a DSP (Digital Signal Processor); a switch circuit configured to switch connections between the terminals and the communication paths, respectively; and a communication path control unit configured to control the DSPs and the switch circuit, wherein the communication path control unit performs control for preferentially allocating any of the plurality of communication paths to the first terminal, the DSP of the allocated communication path determines whether a sound from the first terminal that was received as input via the switch circuit is an abnormal sound, and notifies the communication path control unit in the case of determining that the sound is an abnormal sound, and upon receiving the notification, the communication path control unit determines an alert destination based on the notification, and performs alert processing for sending an alert to the alert destination.

According to this configuration of the present invention, a communication path can be ensured for the first terminal regardless of the terminal usage situation, and therefore the DSP of the allocated communication path is able to reliably determine whether a sound is an abnormal sound, and an alert can be reliably sent to an alert destination when an abnormality has occurred.

Furthermore, according to the present invention, the intercom exchange may further include: a memory configured to store an allocation table for controlling allocation states of the plurality of communication paths, wherein the communication path control unit may reference the allocation table stored in the memory, and dynamically switch the communication path to be preferentially allocated to the first terminal.

Also, the communication path control unit may perform the alert processing for sending the alert to the alert destination using a method selected from among a plurality of different alert methods. Also, as the alert processing, the communication path control unit may perform processing for displaying, on a display unit, video information from a surveillance camera capturing images of an area in which the first terminal that received the input of the abnormal sound is installed.

Advantageous Effects

According to the present invention, an alert can be reliably sent if an abnormal sound has been detected, even if there is the risk of multiple communication paths between terminals being used at the same time, without the detection regarding an abnormal sound being performed by terminals.

BRIEF DESCRIPTION OF DRAWINGS

FIG. 3 is a diagram showing an example of a control table in FIG. 2;

FIG. 4 is a diagram showing an example of an allocation table in FIG. 2;

DESCRIPTION OF EMBODIMENTS

Embodiment 1

Figure 1:
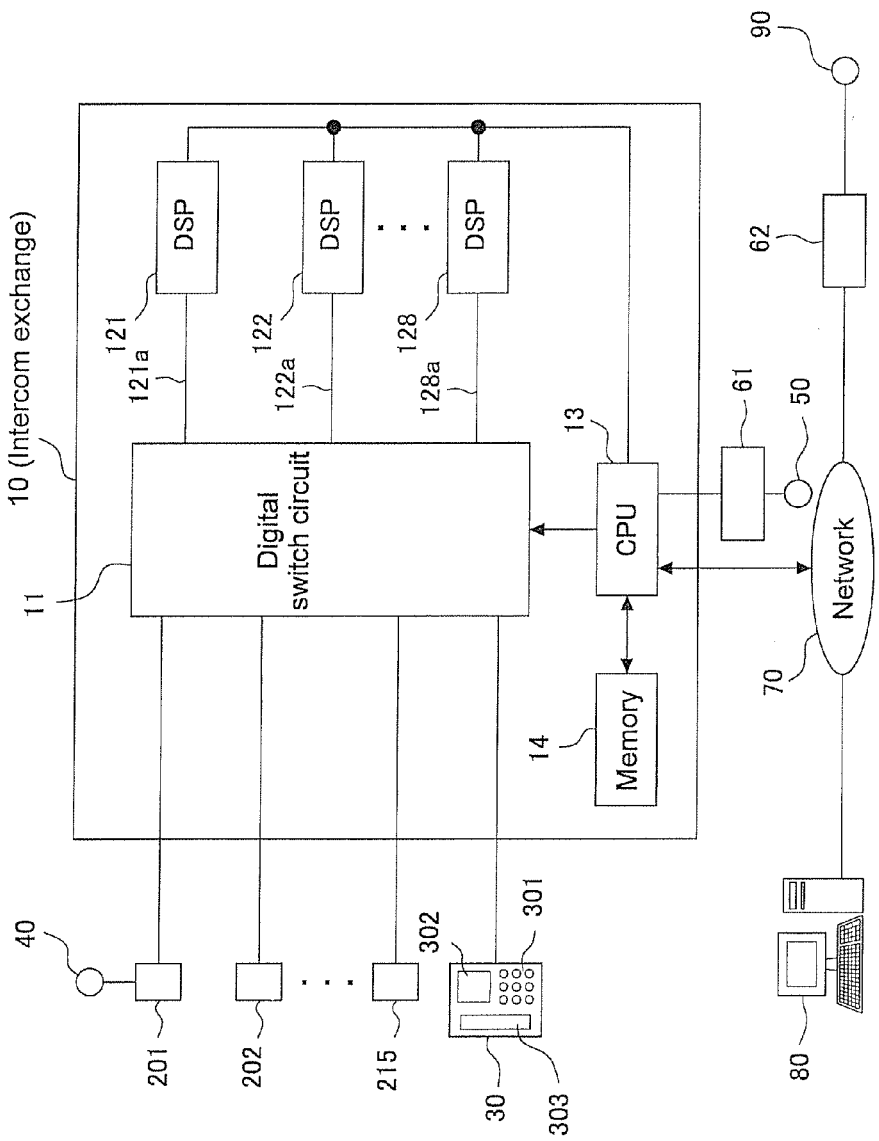
FIG. 1 is a diagram showing an example of the overall configuration of a system including an intercom exchange according to Embodiment 1 of the present invention.

FIG. 1 is a diagram showing an example of the overall configuration of a system including an intercom exchange 10 according to Embodiment 1 of the present invention.

The intercom exchange 10 in FIG. 1 is connected to 16 terminals 201, 202, . . . , 215, and 30, and is configured so as to be able to switch communication paths between these terminals. In the description of this embodiment, the 15 terminals 201 to 215 are slave devices, and the terminal 30 is a master device. The terminal 201 in FIG. 1 is connected to a warning light 40. Note that the connections between the intercom exchange 10 and the terminals may be achieved via wired connection or via wireless connection.

Furthermore, the intercom exchange 10 is connected to a warning light (indicating lamp) 50 via an external device interface 61 (hereinafter, referred to as the interface 61). The intercom exchange 10 is also connected to an external device interface 62 (hereinafter, referred to as the interface 62) and a control terminal 80 via a network 70 such as a LAN (Local Area Network). The interface 62 is connected to a warning light 90.

[Intercom Exchange Configuration]

As shown in FIG. 1, the intercom exchange 10 includes a digital switch circuit 11, eight DSPs (Digital Signal Processor) 121, 122, . . . , and 128 that are respectively included in communication paths 121a, 122a, . . . , and 128a, a CPU (communication path control unit) 13, and a memory 14. Although eight DSPs are provided since there are eight communication paths in the intercom exchange 10 of this embodiment, the number of communication paths and DSPs may be changed.

The digital switch circuit 11 is connected to the 16 terminals 201 to 215 and 30 and the eight communication paths (DSPs 121 to 128), and is configured so as to switch connections between the terminals and the communication paths (DSPs 121 to 128). The digital switch circuit 11 of this embodiment is configured so as to be able to switch multiple connections between terminals by switching connections between terminals and communication paths (DSPs).

The DSPs 121 to 128 of the communication paths are each configured so as to perform processing for encoding and decoding input audio signals, and can also perform abnormal sound detection if a later-described audio trigger function has been set.

The CPU 13 is configured so as to perform overall control of the intercom exchange 10. The CPU 13 of this embodiment switches connections between communication paths (DSPs) and terminals by controlling the digital switch circuit 11. The CPU 13 is furthermore configured so as to cause the warning light 50 to operate by sending a command to the interface 61. The CPU 13 is also configured so as to cause the warning light 90 to operate by sending a command to the interface 62 via the network 70. The interfaces 61 and 62 of this embodiment are configured so as to cause the warning lights 50 and 90, respectively, to operate through contact output in accordance with a command from the CPU 13.

The memory 14 stores various types of data and programs necessary for controlling the overall operation of the intercom exchange 10.

[Master Terminal Configuration]

A description of an example of the configuration of the master terminal 30 will be given next with reference to FIG. 1.

The master terminal 30 in FIG. 1 is configured to include an operation button 301, a display unit 302 such as a display, a handset 303, a CPU (not shown), a speaker (not shown), and the like.

[Slave Device Configuration]

A description of an example of the configuration of the terminals 201 to 215 will be given next with reference to FIG. 1.

The terminals 201 to 215 in FIG. 1 are each configured to include a CPU (not shown) and the like. Furthermore, the terminals 201 to 215 is each able to make a call to the master terminal 30. In the description of this embodiment, the terminals are each envisioned as being a camera-equipped door intercom, an intercom capable of contact with a master device, or a master terminal capable of hands-free communication or the like.

The terminal 201 in FIG. 1 is a camera-equipped door intercom, for example, and is configured so as to be able to operate in coordination with the warning light 40 through contact output. Furthermore, the terminal 201 of this embodiment is equipped with a microphone (not shown), and is configured so as to pick up external sounds (e.g., an outcry, a noise, or a conversation) with the microphone, and automatically perform digital conversion on the sound to generate and output the audio data to the intercom exchange 10. In the following description, such a function (function for picking up a sound and automatically outputting it) is referred to as a sound input/output function. In this embodiment, among the 16 terminals, the four door intercoms 201 to 204 (hereinafter, each being referred to as a first terminal) are assumed to have the sound input/output function, but the number of first terminals may be changed.

[Control Terminal Configuration]

The control terminal 80 in FIG. 1 is a personal computer, for example, and is configured to include a monitor, a CPU, a memory, and the like. In this embodiment, the control terminal 80 can set various types of settings of the intercom exchange 10, such as setting the later-described audio trigger function.

[Overview of Crime Prevention Method]

Next is a description of an example of a crime prevention method realized by the system described above.

The intercom exchange 10 is installed in the security guard room of a building, for example, and the terminals 201 to 215 and 30 are installed in a parking lot, an entrance hall, the security guard room, and the like. For example, the first terminals 201 to 204 are installed in the parking lot and the entrance hall, and the master terminal 30 and the control terminal 80 are installed in the security guard room. A security guard, for example, is stationed in the security guard room, and monitors the building and the like.

Here, the intercom exchange 10 has the audio trigger function, which is for, if an abnormal sound such as an outcry has been made in any of the places where the first terminals 201 to 204 are installed such as the parking lot and the entrance hall, immediately sending an alert regarding the abnormal situation.

The audio trigger function is a function for preferentially allocating a communication path (DSP) in the intercom exchange 10 to a first terminal connected to the intercom exchange 10, and causing the allocated DSP to detect whether a sound is an abnormal sound.

In the control terminal 80, communication paths are allocated to the first terminals 201 to 204 in advance by, for example, setting the audio trigger function with respect to the first terminals 201 to 204. The DSPs in the allocated communication paths then detect the sound pressure of audio data from the respective first terminals 201 to 204 that is input thereto via the digital switch circuit 11, and determine whether the sound is an abnormal sound. If a determination that the sound is an abnormal sound has been made, the intercom exchange 10 can send an abnormality notification to an alert destination that has been set in advance.

Using the sound input/output function, the first terminal automatically picks up an external sound (outcry, noise, conversation, or the like) and outputs the sound to the intercom exchange 10. The intercom exchange 10 then allocates a communication path to the first terminal by setting the audio trigger function described above.

When the intercom exchange 10 has received an input of the sound output from the first terminal, the DSP in the communication path allocated to the first terminal determines whether the sound is an abnormal sound, and if the sound is an abnormal sound, an abnormality alert destination is determined. In this embodiment, the master terminal 30, for example, is set as the abnormality alert destination, and therefore in order to send an alert to the master terminal 30, the intercom exchange 10 establishes a communication network between the first terminal and the master terminal 30 by allocating an available communication path (DSP), and an alert regarding the abnormality is sent to the master terminal 30. Examples of the alert method include outputting a call sound, outputting an image, and operating a warning light, but the intercom exchange 10 may make an alert using any other method.

[Intercom Exchange Functions]

A description of functions of the DSP 121 and the CPU 13 of the intercom exchange 10 will be given next with reference to FIG. 2.

Figure 2:
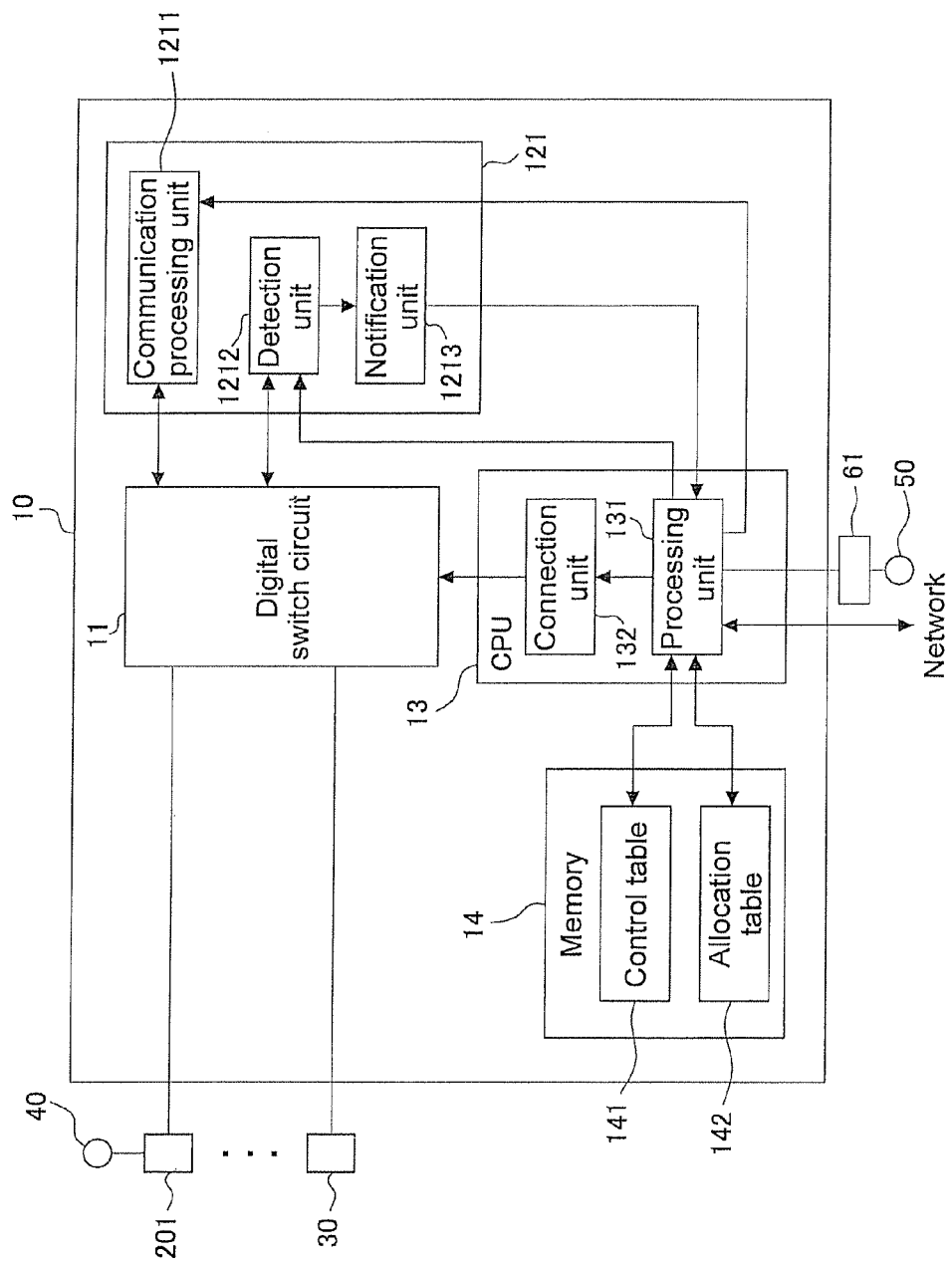
FIG. 2 is a diagram showing functions of a DSP and a CPU of the intercom exchange in FIG. 1.

FIG. 2 is a diagram showing functions of the DSP 121 and the CPU 13 of the intercom exchange 10. Note that although one DSP 121 is shown in FIG. 2, the other DSPs 122 to 128 also have the same functions as the DSP 121.

The DSP 121 of the intercom exchange 10 in FIG. 2 includes a communication processing unit 1211, a detection unit 1212, and a notification unit 1213.

The communication processing unit 1211 processes communication with a connected terminal. For example, the communication processing unit 1211 performs processing for encoding and decoding a sound signal.

The detection unit 1212 detects a sound from the first terminal that has been received as input via the digital switch circuit 11, and determines whether the sound is an abnormal sound. An abnormal sound is set in advance based on the viewpoint of whether the level of the sound pressure or frequency of a sound subject to determination is a level set in advance, and the detection unit 1212 makes the determination of whether the sound is an abnormal sound based on this viewpoint.

Furthermore, the detection unit 1212 exchanges information with the first terminal in accordance with a request from the CPU 13.

If the detection unit 1212 has determined that the sound is an abnormal sound, the notification unit 1213 sends a notification to the CPU 13. This notification includes the terminal number (identification number) of the first terminal that picked up the abnormal sound.

The CPU 13 in FIG. 2 includes a processing unit 131 and a connection unit 132.

The processing unit 131 ensures a communication path (DSP) for the first terminal by preferentially allocating any communication path (DSP) among the multiple communication paths (DSPs) to the first terminal. In this embodiment, it is assumed that, for example, the four DSPs 121 to 124 are statically allocated for the four first terminals 201 to 204.

Furthermore, the processing unit 131 determines an abnormality alert destination based on a notification from the notification unit 1213 of a DSP. In this embodiment, the case where the master terminal 30 having the functionality of a master device is the abnormality alert destination is described as an example. In this case, the processing unit 131 allocates an available communication path (DSP) as the communication path for the master terminal 30 determined to be the abnormality alert destination. Note that if no communication path (DSP) is available, a statically allocated communication path (DSP) may be released and allocated to the master terminal 30.

The processing unit 131 of this embodiment allocates a communication path (DSP) by referencing various types of tables 141 and 142 that are described later.

The processing unit 131 performs processing for sending an alert to the master terminal 30 (alert destination) using a method selected from among various different alert methods. Three examples of alert methods for alert processing are making a call, outputting an image to a monitor (display unit), and operating a warning light.

The connection unit 132 controls the digital switch circuit 11 in order to connect the first terminal and the master terminal 30 via the communication path (DSP) allocated by the processing unit 131.

The memory 14 in FIG. 2 stores a control table 141 and an allocation table 142. In this embodiment, the control table 141 stores various types of information regarding the terminals 201 to 215 and 30, and the allocation table 142 stores information indicating the allocation states of the eight DSPs 121 to 128.

FIG. 3 is a diagram showing an example of the control table 141.

The control table 141 in FIG. 3 is configured to include the items "Terminal No.", "Type", "Master Device No.", "Warning Light", "Camera", "Audio Trigger Function", "Installation Location", and "External Contact No.". The identification number of each terminal is stored under "Terminal No.", and one of door intercom, intercom, and master terminal is displayed under "Type". Whether operation in conjunction with a warning light is possible is indicated under "Warning Light", and the identification number of the master device that is to be associated with a targeted terminal is stored under "Master Device No." in order to associate a slave device with a master device. The master device with the master device No. referred to here is the above-described abnormality alert destination. In this embodiment, the master terminal 30 is associated as the master device with the terminals 201 to 215, for example. Whether a camera is provided is indicated under "Camera", and whether the above-described audio trigger function is enabled or disabled is indicated under "Audio Trigger Function".

In this embodiment, a communication path (DSP) is allocated to a first terminal if the audio trigger function thereof is set as enabled, and the allocated DSP determines whether a sound picked up by the sound input/output function of that first terminal is an abnormal sound. In the control table 141 in FIG. 3, it is assumed that the audio trigger functions of the four first terminals 201 to 204, for example, are set as enabled.

The audio trigger function can be set as enabled or disabled by schedule management performed by software or a remote operation from the control terminal 80.

For example, in the case of setting the audio trigger function as enabled or disabled by a remote operation from the control terminal 80, the control terminal 80 sets the audio trigger function for a first terminal as enabled or disabled using a selection list displayed on the monitor. The selection list enables a desired first terminal to be selected from among first terminals presented as options using a click operation, for example. The first terminals presented as options are the terminals that are connected to the intercom exchange 10, and the intercom exchange 10 notifies the control terminal 80 of the first terminals that are options in accordance with a request from the control terminal 80.

When a first terminal is selected from the selection list described above, the control terminal 80 sends, to the intercom exchange 10 via the network 70, a command for enabling or disabling the audio trigger function for that first terminal in accordance with the selection. In accordance with the command, the CPU 13 of the intercom exchange 10 sets "Enabled" or "Disabled" under the "Audio Trigger Function" item in the control table 141.

The locations where the terminals are installed are indicated under "Installation Location", and contact numbers indicating the output destinations (e.g., the warning lights 50 and 90) of contacts in the interfaces 61 and 62 are stored under "External Contact No.".

FIG. 4 is a diagram showing an example of the allocation table 142.

The allocation table 142 in FIG. 4 is configured to include the items "Terminal No." and "DSP No.". Identification information of the DSPs allocated to the terminals with the corresponding terminal numbers is stored under "DSP No.". In this embodiment, the four DSPs 121 to 124 are statically allocated to the first terminals 201 to 204 respectively, and the other DSPs 125 to 128 are each allocated as needed in accordance with the usage situation of the terminals 205 to 215 and 30.

Figure 5:
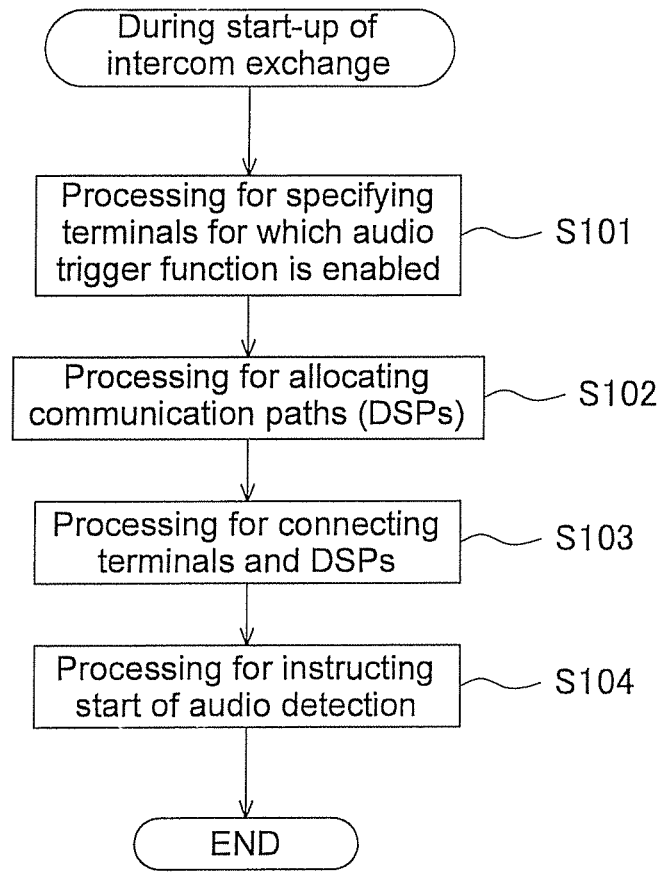
FIG. 5 is a flowchart showing processing performed during start-up of the intercom exchange.
Figure 6:
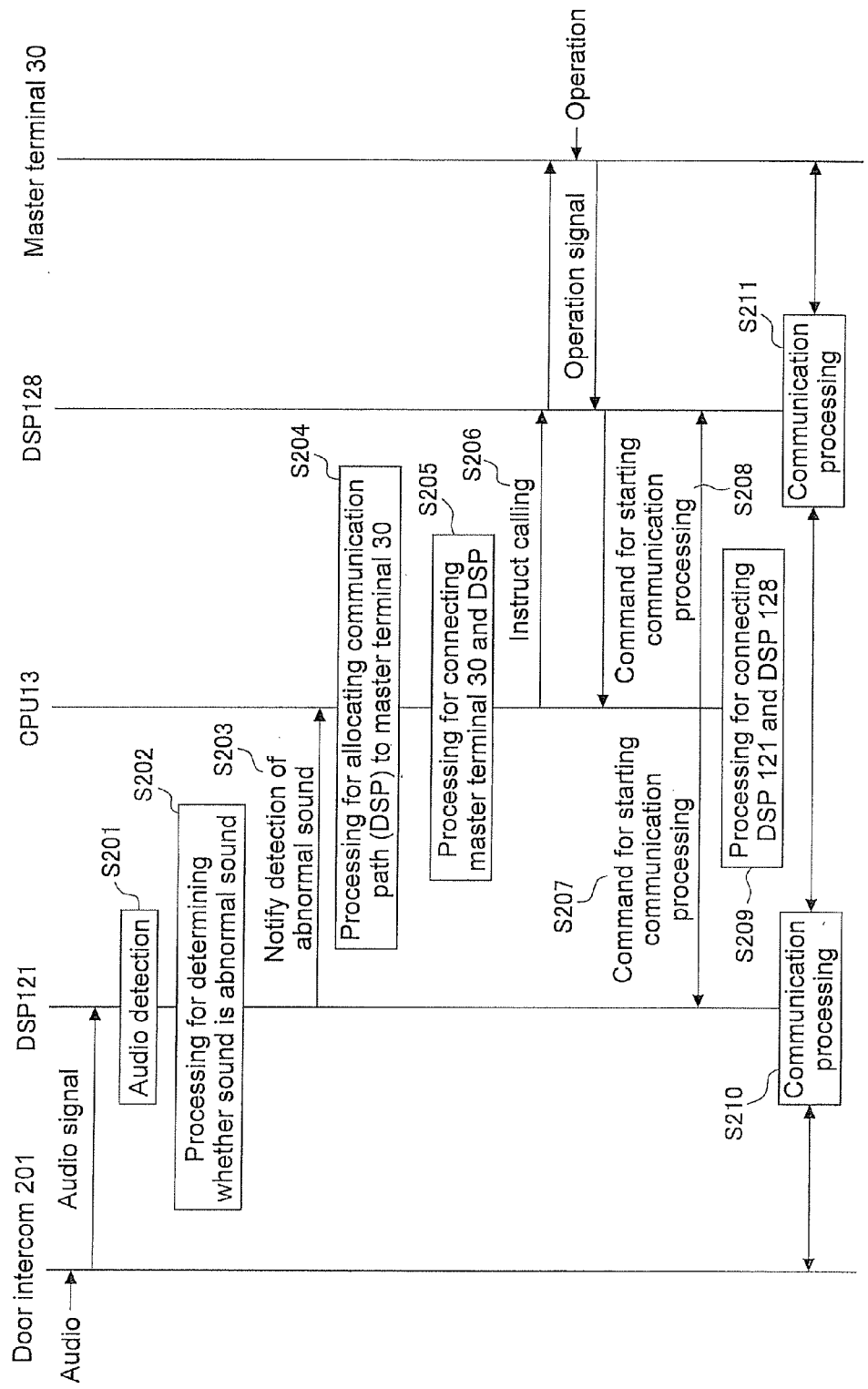
FIG. 6 is a flowchart showing alert processing performed if an abnormal sound picked up through a sound input/output function of a first terminal has been detected.

Next is a description of processing executed by the intercom exchange 10 in order to realize this crime prevention method with reference to FIGS. 5 and 6. First, a description of processing performed during start-up of the intercom exchange 10 will be given with reference to FIG. 5.

FIG. 5 is a flowchart showing processing performed during start-up of the intercom exchange 10. Note that although processing performed during start-up of the intercom exchange 10 is shown in FIG. 5 for example, similar processing can be performed in accordance with a predetermined timing (e.g., after the control terminal 80 has set the audio trigger function as enabled or disabled).

When the intercom exchange 10 starts up, the intercom exchange 10 (processing unit 131) performs processing for specifying terminals for which the audio trigger function is enabled (step S101). In this case, the processing unit 131 references the control table 141 (FIG. 3), and extracts the terminal numbers of the first terminals for which "Enabled" is indicated under the item "Audio Trigger Function". For example, in this embodiment, there are four first terminals for which the audio trigger function is enabled, and therefore the processing unit 131 extracts the four terminal numbers respectively given to the four first terminals 201 to 204.

Next, the intercom exchange 10 (processing unit 131) performs processing for allocating communication paths to the terminals for which the audio trigger function is enabled (step S102). In this case, the processing unit 131 preferentially allocates any communication path among the communication paths 121a to 128a for each of the terminals for which the audio trigger function is enabled, and sets the DSPs of the allocated communication paths as in-use. For example, in the case of allocating the communication paths 121a to 124a respectively to the four first terminals 201 to 204 for which the audio trigger function in enabled, the processing unit 131 stores the terminal numbers of the first terminals 201 to 204 and the DSP numbers of the DSPs 121 to 124 of the communication paths to be allocated to the first terminals 201 to 204, in association with each other in the allocation table 142 (FIG. 4).

Next, the intercom exchange 10 (connection unit 132) performs processing for connecting the first terminals 201 to 204 and the DSPs 121 to 124 respectively (step S103). In this case, the connection unit 132 controls the digital switch circuit 11 in order to establish connections between the first terminals 201 to 204 and the DSPs 121 to 124, respectively, based on the allocation processing performed by the processing unit 131. Accordingly, the four first terminals 201 to 204 are respectively connected to the DSPs 121 to 124. Specifically, the DSP 121 is allocated to the first terminal 201, and the DSP 122 is allocated to the first terminal 202. Accordingly, a communication path (DSP) is ensured for each of the first terminals, regardless of the usage situation of the other terminals 205 to 215 and 30. Note that when the other terminals 205 to 215 and 30 are to be used, the intercom exchange 10 allocates available DSPs from among the other DSPs 125 to 128.

Next, the intercom exchange 10 (processing unit 131) performs processing for instructing the start of audio detection through the sound input/output function (step S104). In this case, the processing unit 131 causes the detection unit 1212 of the DSP 121 to start operating by outputting a command to the detection unit 1212. Upon receiving an input of the command from the processing unit 131, the detection unit 1212 can detect a sound picked up through the sound input/output function of the first terminal, and determine whether the sound is an abnormal sound.

Next, a description of alert processing performed in the case where a sound picked up through the sound input/output function of a first terminal is an abnormal sound will be given with reference to FIG. 6.

FIG. 6 is a flowchart showing alert processing performed in the case where a sound picked up through the sound input/output function of the first terminals 201 to 204 is an abnormal sound.

For example, when the door intercom 201 serving as the first terminal automatically picks up an external sound (e.g., a conversation being had by a person in the vicinity of the door intercom 201) through the sound input/output function, the door intercom 201 outputs the resulting audio signal (sound signal) to the intercom exchange 10. The DSP 121 (detection unit 1212) of the intercom exchange 10 that has received an input of the audio signal from the door intercom 201 detects the audio from the door intercom 201 (step S201), and determines whether the audio is an abnormal sound (step S202). In this case, for example, the detection unit 1212 may determine that the audio is an abnormal sound if the level of the sound pressure of the audio from the door intercom 201 is a level (i.e. a level that is greater than or equal to a threshold value) that has been set in advance, or may determine that the audio is an abnormal sound if the level of the frequency of the audio from the door intercom 201 is a level (i.e. a level within a range) that has been set in advance.

If the DSP 121 has determined that the audio is an abnormal sound, the DSP 121 (notification unit 1213) notifies the CPU 13 that an abnormal sound was detected (step S203).

Upon receiving the above-described detection notification, the CPU 13 (processing unit 131) performs allocation processing in order to ensure a communication path (DSP) for the master terminal 30 (step S204). In this case, first the processing unit 131 references the control table 141, and extracts the master device number associated with the terminal number of the door intercom 201 indicated in the above-described detection notification. In this embodiment, the case where the master terminal 30 is the master device is described as an example, and therefore first the processing unit 131 extracts the terminal number of the master terminal 30 (Master Device No.) from the corresponding record in the control table 141. The processing unit 131 then references the allocation table 142, determines one available communication path (DSP) (e.g., the DSP 128) among the eight communication paths (DSPs 121 to 128), and stores the DSP number of that DSP and the extracted master device number (in this embodiment, the terminal number of the master terminal 30) in association with each other in the allocation table 142 (FIG. 4).

Next, the CPU 13 (connection unit 132) performs processing for connecting the master terminal 30 and the allocated communication path (e.g., the DSP 128) (step S205). In this case, the connection unit 132 controls the digital switch circuit 11 in order to connect the master terminal 30 and the communication path allocated by the processing unit 131 (e.g., the DSP 128). A communication path (DSP) is therefore ensured for the master terminal 30.

Next, for example, the CPU 13 (processing unit 131) gives the DSP 128 a call instruction for calling the master terminal 30 (step S206). In this case, the processing unit 131 outputs to the DSP 128 a command addressed to the master terminal 30, and upon receiving the command as input, the DSP 128 outputs the command to the master terminal 30 via the digital switch circuit 11. Upon receiving the command as input, the master terminal 30 outputs a call sound from a built-in speaker, for example. Alternatively, the master terminal 30 displays an image for calling on the display unit 302, for example. Accordingly, when the security guard operates the master terminal 30 (e.g., the operation button 301) in order to respond to the call, for example, the master terminal 30 outputs the resulting operation signal to the CPU 13 via the DSP 128 of the intercom exchange 10.

Note although the case where the CPU 13 (processing unit 131) gives a call instruction is described as an example in step S206 of FIG. 6, the CPU 13 may give an instruction for causing the display unit 302 of the master terminal 30 to output images (video) picked up by the camera of the door intercom 201, or give an instruction for causing a warning light (not shown) connected to the master terminal 30 to operate. Alternatively, the CPU 13 (processing unit 131) may give a combination of the different instructions described above.

Upon receiving the operation signal as input, the CPU 13 (processing unit 131) outputs a command for starting communication processing to the DSP 121 (communication processing unit) (step S207), and outputs a command for starting communication processing to the DSP 128 (communication processing unit) (step S208).

Next, the CPU 13 (connection unit 132) performs processing for connecting the DSP 121 and the DSP 128 (step S209). In this case, the connection unit 132 controls the digital switch circuit 11 in order to realize this connection processing.

Next, the DSP 121 (communication processing unit) performs communication processing for realizing communication between the door intercom 201 and the master terminal 30 (step S210), and the DSP 128 (communication processing unit) also performs communication processing for realizing communication between the door intercom 201 and the master terminal 30 (step S211). In this case, each communication processing unit performs, for example, processing for encoding or decoding an audio signal. Accordingly, the security guard can, for example, communicate with a party at the door intercom 201 by operating the master terminal 30.

Note that when communication between the door intercom 201 and the master terminal 30 ends, the master terminal 30 outputs a predetermined signal to the intercom exchange 10. Upon receiving that signal as input, the CPU 13 (processing unit 131) of the intercom exchange 10 references the allocation table 142 (FIG. 4) and sets the DSP 128 as unused by deleting the corresponding record (the record associating the master terminal 30 with the DSP 128).

The CPU 131 (connection unit 132) then controls the digital switch circuit 11 so as to cut the connection between the DSP 121 and the DSP 128 and the connection between the master terminal 30 and the DSP 128, and performs processing for instructing the DSP 121 to start detecting audio picked up through the sound input/output function. Accordingly, the detection unit 1212 of the DSP 121 can detect a sound picked up by the first terminal 201, and therefore the processing of steps S201 to S211 described above can be performed.

As described above, the intercom exchange 10 of this embodiment ensures communication paths (DSPs 121 to 124) for the first terminals 201 to 204 regardless of the usage situation of the terminals 201 to 215 and 30, and therefore the DSPs 121 to 124 are each able to reliably determine whether a sound picked up through the sound input/output function of the first terminal is an abnormal sound, and thus can reliably notify the master terminal 30 if an abnormality has occurred.

Furthermore, the terminals 201 to 215 of this embodiment each transmit a sound received as input from a microphone (not shown) to the intercom exchange 10. The intercom exchange 10 then determines whether the sound from that microphone is abnormal. Accordingly, with this system, the terminals do not need to be provided with functionality (circuitry) for detecting whether a sound is an abnormal sound, thus enabling a reduction in the size of the terminals 201 to 215.

Embodiment 2

Next, as an embodiment of a system, a description will be given regarding a system in which, when an abnormal sound has been detected, video of the site at which the abnormal sound was made can also be displayed. With this system, video of the site captured using a surveillance camera is displayed, unlike the system of Embodiment 1. For this reason, the system of this embodiment includes multiple surveillance cameras and a monitor (display unit).

[System Configuration]

Figure 7:
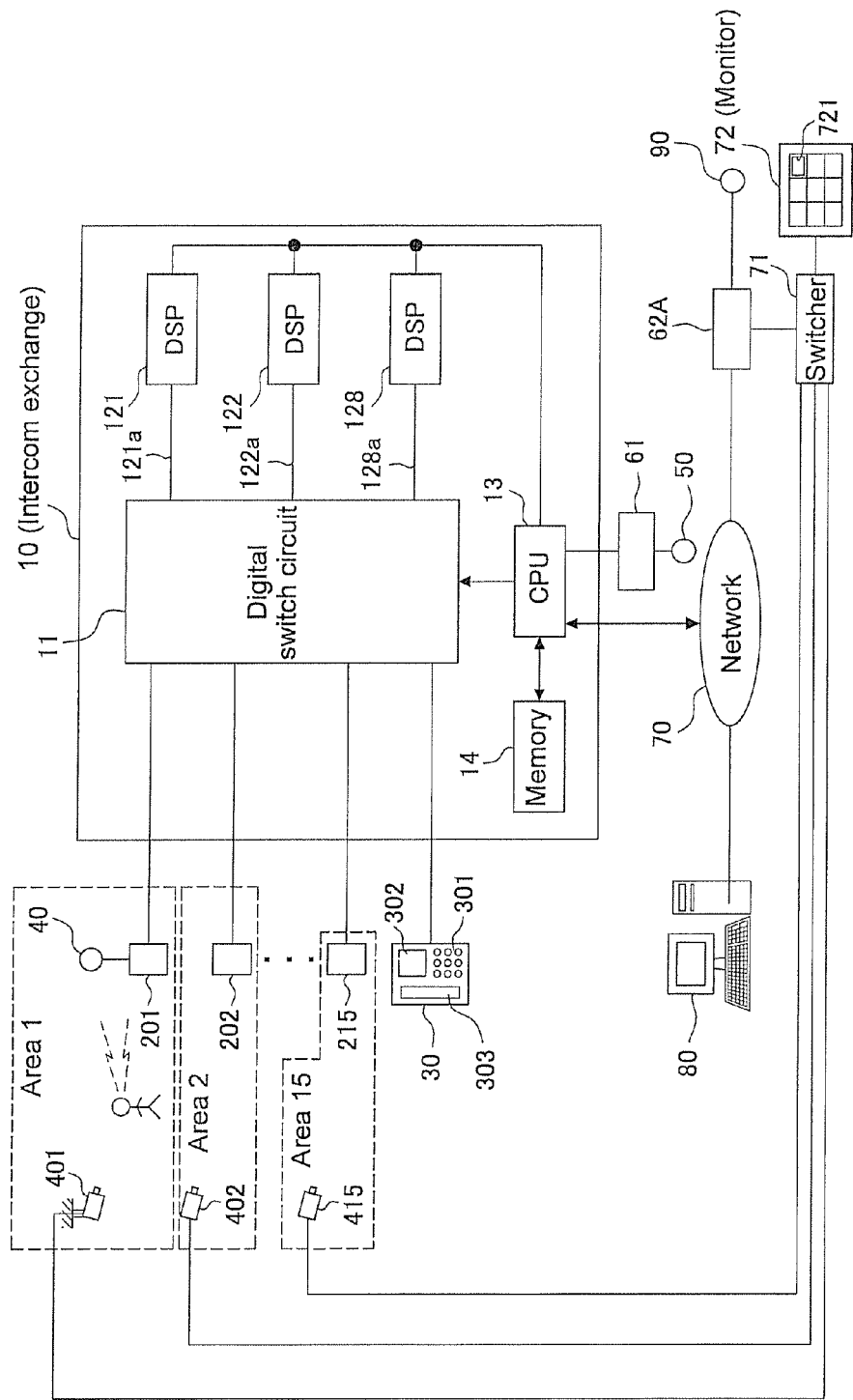
FIG. 7 is a diagram showing an example of the overall configuration of a system including an intercom exchange according to Embodiment 2 of the present invention.

FIG. 7 shows the overall configuration of the system according to the present embodiment. As shown in FIG. 7, unlike the system of Embodiment 1 (the system shown in FIG. 1), the system of this embodiment includes surveillance cameras 401, 402, . . . , and 415, a switcher 71 configured so as to be capable of communication with the surveillance cameras, an interface 62A that is connected to the switcher 71, and a monitor 72 serving as a display unit.

Note that in FIG. 7, constituent elements that are the same as those of the system shown in FIG. 1 have been given the same reference signs.

The surveillance camera 401 captures images in an area 1 in which the terminal 201 is installed, and transmits the resulting video information to the switcher 71. For example, this transmission may be performed constantly, periodically, or when the video captured by the surveillance camera 401 has changed. In this embodiment, the 15 surveillance cameras 401, 402, . . . , and 415 are installed, and therefore video information for areas 1, 2, . . . , and 15 is transmitted to the switcher 71 by the surveillance cameras 401, 402, . . . , and 415 respectively.

The switcher 71 receives the video information transmitted from the 15 surveillance cameras 401, 402, . . . , and 415, and switches the video information that is to be displayed by the monitor 72. This switching of video information is performed in accordance with a predetermined timing. For example, this predetermined timing may be periodic, the case where the video has changed, or the case where the switcher 71 has received a later-described selection signal (information for requesting a switch to a specified surveillance camera).

Unlike the interface 62 of Embodiment 1, the interface 62A transmits a contact signal from an output terminal (not shown) to the switcher 71 if the interface 62A has received, from the intercom exchange 10, a selection signal for requesting a switch to a specified surveillance camera. This contact signal is an ON signal for a make contact switch, for example. In this embodiment, 15 surveillance cameras are installed, and therefore the output terminal of the interface 62A includes 15 make contact switches for performing surveillance camera selection. The selection signal is transmitted from the intercom exchange 10 in accordance with an instruction given by the CPU 13 of the intercom exchange 10.

If the switcher 71 has received a contact signal from the interface 62A, the switcher 71 causes the monitor 72 to switch to the video information of the corresponding surveillance camera, and also carry out processing for emphasizing the screen including such video information (e.g., displaying the frame of a split screen in red, or performing enlarged video display). In the example in FIG. 7, the monitor 72 displays nine split screens, and displays the frame of the corresponding split screen 721 in red.

[System Operation]

The following describes overall operations performed in the present embodiment in the case where a request for switching to a specified surveillance camera is given by the intercom exchange 10, with reference to FIG. 6. Note that although the processing of steps S201 to S211 in FIG. 6 is performed in the system of the present embodiment as well, a description of such processing will not be given here since it is the same as that in Embodiment 1.

The following describes operations of the system of the present embodiment that differ from those in Embodiment 1.

After the processing of step S203 in FIG. 6, the CPU 13 (processing unit 131) of the intercom exchange 10 that received an abnormal sound detection notification in step S203 furthermore references the control table 141 (in the present embodiment, the control table 141 also includes associations between terminal numbers and numbers of external contact serving as the selection signal), and selects the external contact number that is associated with the terminal number of the first terminal included in the detection notification (e.g., the external contact number for requesting a switch to the surveillance camera 401). The CPU 13 (processing unit 131) then transmits the selected external contact number to the interface 62A via the network 70 (alert processing for displaying video information for the area in which the abnormal sound was made on the monitor 72). Accordingly, the interface 62A turns on the make contact switch corresponding to the received external contact number, and transmits an ON signal from that make contact switch to the switcher 71. Thereafter, the switcher 71 receives the ON signal from the interface 62A, and causes the monitor 72 to switch to the video information from the surveillance camera specified by the ON signal (e.g., the surveillance camera 401), and also carry out processing for emphasizing the screen including such video information (e.g., displaying the frame of the split screen 721 in red). Accordingly, video of the site at which the abnormal sound was made is displayed (presented for alerting) by the monitor 72 (alert destination).

Embodiment 3

A description of a system according to Embodiment 3 will be given next.

Unlike Embodiment 2 (the system shown in FIG. 7), in the system of this embodiment, video information from a surveillance camera is switched by a control terminal instead of by a switcher. For this reason, in the system of this embodiment, multiple surveillance cameras are connected to a network.

Figure 8:
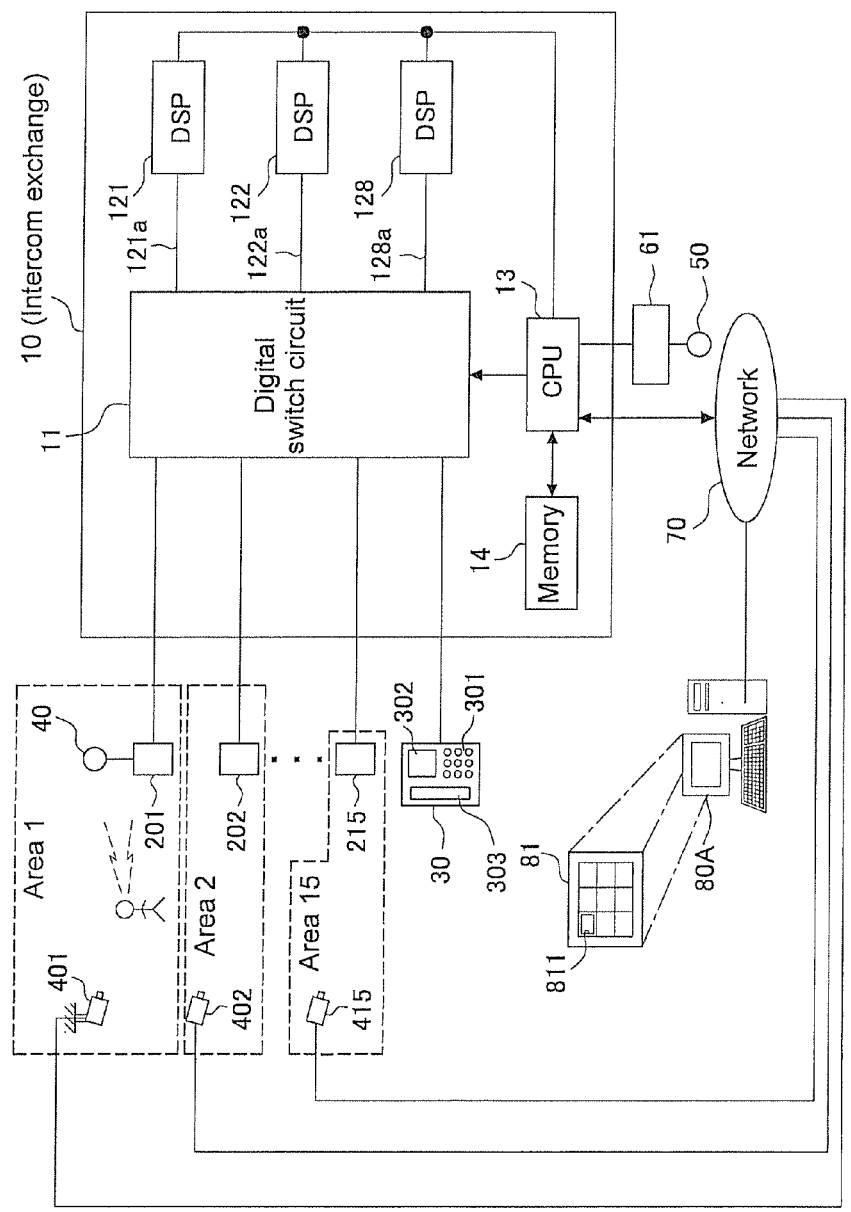
FIG. 8 is a diagram showing an example of the overall configuration of a system including an intercom exchange according to Embodiment 3 of the present invention.

FIG. 8 is a diagram showing the overall configuration of the system according to Embodiment 3. As shown in FIG. 8, the surveillance cameras 401, 402, . . . , and 415 are connected to a control terminal 80A serving as a display unit, via the network 70.

Note that in FIG. 8, constituent elements that are the same as those of the system shown in FIG. 7 have been given the same reference signs.

Unlike the control terminal 80 in Embodiment 2, in order to display video information from the surveillance cameras 401, 402, . . . , and 415, the control terminal 80A includes a configuration with which the surveillance cameras can be managed centrally. Accordingly, by providing the control terminal 80A with functions corresponding to the switcher 71 and the monitor 72 (FIG. 7) described above, the system of the present embodiment enables realizing effects similar to those of the system of Embodiment 2.

In FIG. 8, the control terminal 80A displays a display screen 81 as being split into nine sections, and displays video information from one surveillance camera in a split screen 811.

In the system of the present embodiment, this operation differs from Embodiment 2 in that video information transmitted from a surveillance camera is displayed by the control terminal 80A. Note that although the processing of steps S201 to S211 in FIG. 6 is performed in the system of the present embodiment as well, a description of such processing will not be given here since it is the same as that in Embodiment 1.

The following describes operations of the system of the present embodiment that differ from those in Embodiment 2.

After the processing of step S203 in FIG. 6, based on the abnormal sound detection notification (including the terminal number of the terminal that received an input of an abnormal sound) that was received in step S203, the CPU 13 (processing unit 131) of the intercom exchange 10 extracts information (e.g., the surveillance camera number) related to the surveillance camera that is capturing images of the area in which the terminal that received the input of the abnormal sound is installed. Here, the memory 14 of the intercom exchange 10 stores the terminal number included in the detection notification and the information regarding the surveillance camera that is capturing images of the area in which the terminal specified by that terminal number is installed, and the CPU 13 (processing unit 131) references such stored information and extracts the surveillance camera-related information that corresponds to the terminal number included in the detection notification. The CPU 13 (processing unit 131) then transmits the extracted surveillance camera-related information to the control terminal 80A via the network 70 (alert processing for displaying video information for the area in which the abnormal sound was made on the monitor 72). Accordingly, the control terminal 80A receives the surveillance camera-related information from the CPU 13 (processing unit 131), switches to the surveillance camera specified by the information, and performs processing for emphasizing the screen including such video information (e.g., displays the frame of the split screen 811 in red). Accordingly, in the system of the present embodiment as well, if an abnormal sound has been detected, the control terminal 80A (alert destination) can display (present for alerting) video of the site at which the abnormal sound was made.

[Variations]

A description of variations of the embodiments described above will be given next.

Although the case where the four DSPs 121 to 124 are statically allocated to the first terminals 201 to 204 is described above, DSPs may be preferentially allocated by dynamically allocating any of the DSPs. One example of a method of dynamic allocation is a method of switching DSPs at a predetermined interval (e.g., 5 seconds). In this case, the processing unit 131 switches the DSPs allocated to the respective first terminals at the predetermined interval, and the connection unit 132 controls the digital switch circuit 11 in order to connect the first terminals and the switched DSPs. Even with this configuration, a communication network between the first terminals and the DSPs can be ensured.

Also, another example of a method of dynamic allocation is a method of switching DSPs in accordance with schedule management. In schedule management, a pattern for dynamically allocating DSPs (e.g., statically allocating or dynamically switching DSPs in accordance with certain time periods) is set in advance.

Also, although cases where the master terminal 30, the monitor 72, and the control terminal 80A serve as abnormality alert destinations are described in the above embodiments, it is possible for the alert destination to be a second terminal (master device) controlled by another intercom exchange via the network 70. In this case, the control table 141 in FIG. 3 has, for example, records indicating an association between a first terminal and a second terminal (or another intercom exchange controlling the second terminal), and when the CPU 13 (processing unit 131) receives a notification from the notification unit 1211 of the DSP 121, for example, the CPU 13 references the corresponding record in the control table 141, and determines that the second terminal in that record is to be the abnormality alert destination. The CPU 13 (processing unit 131) then sends the notification from the notification unit 1211 to the other intercom exchange via the network. The other intercom exchange has the same configuration as the intercom exchange 10, and upon receiving the notification from the notification unit 1211, the CPU of the other intercom exchange allocates a communication path (DSP) to the second terminal, and outputs a command for starting communication processing to that DSP (the same processing as steps S204 to S206 and S208 in FIG. 6). On the other hand, if the intercom exchange 10 has received a notification of the output of a start command from the other intercom exchange (CPU), the intercom exchange 10 outputs a command for starting communication processing to the DSP allocated to the first terminal (the same processing as step S207 in FIG. 6). This enables communication between the first terminal and the second terminal to be performed via the two intercom exchanges (the same processing as steps S209 to S211 in FIG. 6).

Also, although the case where one location, namely the master terminal 30, serves as the abnormality alert destination is described in the above embodiments, multiple locations may serve as alert destinations. For example, two locations, namely the master terminal 30 and the warning light 50, may serve as alert destinations. In this case, upon receiving a notification from the notification unit 1211 of a DSP, the CPU 13 (processing unit 131) references the corresponding record in the control table 141 (the items "Master Device No." and "External Contact No."), and determines that the master terminal 30 and the warning light 50 are to be the alert destinations. The CPU 13 (processing unit 131) that received the notification from the notification unit 1211 of the DSP then may enable communication between the master terminal 30 and the first terminal by performing the processing of steps S204 to S211 in FIG. 6, and send a command to the interface 61 so as to cause the warning light 50 to operate through the contact output of the interface 61. Alternatively, the CPU 13 (processing unit 131) may send a command to the interface 62 so as to cause the warning light 90 to operate through the contact output of the interface 62. Even with this configuration, a notification can be reliably sent to an external device. Alternatively, three locations, namely the master terminal 30, the monitor 72, and the control terminal 80A (a combination of Embodiments 1 to 3) may be alert destinations.

Note that the hardware configuration and processing sequence in practice may be modified without departing from the spirit of the present invention. For example, distributed processing may be performed by multiple intercom exchanges 10.

What is claimed is:

1. An intercom exchange comprising:
    a plurality of communication paths including a preferentially allocated communication path, and the preferentially allocated communication path configured to receive an external sound;
    each of the plurality of communication paths including a DSP (Digital Signal Processor) and each of the plurality of communication paths is configured to input and output audio data;
    the DSP of the preferentially allocated communication path is configured to determine if the external sound is an abnormal sound and output a notification signal when the external sound is the abnormal sound;
    a switch circuit connected to each of the plurality of communication path, and the switch circuit is configured to switch connections between the plurality of communication paths;
    a communication path control unit configured to:
        control the switch circuit and each of the DSP,
        allocate at least one of the plurality of communication paths as the preferentially allocated communication path before the external sound is received,
        receive the notification signal from the DSP of the preferentially allocated communication path, and
        perform an alert processing in response to receiving the notification signal, the alert processing including outputting an alert signal;

a memory configured to store an allocation table including information indicating an allocation state of the preferentially allocated communication path,
wherein the communication path control unit references the allocation table stored in the memory, and controls the switch circuit to connect the DSP of the preferentially allocated communication path according to the allocation table.

2. The intercom exchange according to claim 1, wherein the communication path control unit performs the alert processing for outputting the alert signal using a method selected from among a plurality of different alert methods.

3. The intercom exchange according to claim 1,
wherein the communication path control unit allocates the at least one of the plurality of communication paths as the preferentially allocated communication path during a start-up of the intercom exchange.

4. The intercom exchange according to claim 1,
wherein after the communication path control unit allocates the at least one of the plurality of communication paths as the preferentially allocated communication path, and controls the switch circuit to connect the DSP of the preferentially allocated communication path, the communication path control unit allows the DSP of the preferentially allocated communication path to start detecting whether the external sound is received.

5. The intercom exchange according to claim 1,
wherein the communication path control unit further configured to change the allocation of the preferentially allocated communication path according to a predetermined schedule.

6. The intercom exchange according to claim 1,
wherein the alert processing of the communication path control unit further includes outputting the alert signal from one of the plurality of communication paths other than the preferentially allocated communication path.

7. A system comprising:
the intercom exchange according to claim 1, and further comprising;
a display unit configured to connect with the intercom exchange, wherein the alert processing further includes a processing for displaying, on the display unit, video information from a surveillance camera capturing images of an area in which a terminal inputting the abnormal sound and outputting the abnormal sound to the intercom exchange is installed.

* * * * *